United States Patent
Iikka

(10) Patent No.: US 6,833,094 B1
(45) Date of Patent: Dec. 21, 2004

(54) DIMENSIONALLY STABLE PARTS HAVING GOOD TORSIONAL STABILITY AND COMPOSITIONS AND METHODS FOR MAKING SAME

(75) Inventor: Ken Iikka, Clinton Township, MI (US)

(73) Assignee: Patent Holding Company, Fraser, MI (US)

( * ) Notice: Subject to any disclaimer, the term of this patent is extended or adjusted under 35 U.S.C. 154(b) by 76 days.

(21) Appl. No.: 10/346,747

(22) Filed: Jan. 17, 2003

Related U.S. Application Data

(60) Provisional application No. 60/350,793, filed on Jan. 22, 2002.

(51) Int. Cl.[7] .............................. C08J 9/10; B29D 7/00
(52) U.S. Cl. ....................... 264/46.1; 521/48; 521/48.5; 521/138; 521/182
(58) Field of Search .......................... 264/46.1; 521/48, 521/48.5, 138, 182

(56) References Cited

U.S. PATENT DOCUMENTS

| | | | | |
|---|---|---|---|---|
| 3,929,943 A | * | 12/1975 | Klimaszewski, Jr. | 264/489 |
| 4,172,859 A | * | 10/1979 | Epstein | 428/402 |
| 5,939,516 A | * | 8/1999 | Greaves et al. | 528/302 |

\* cited by examiner

*Primary Examiner*—Morton Foelak
(74) *Attorney, Agent, or Firm*—Welsh & Katz, Ltd.

(57) ABSTRACT

Compositions, apparatus and methods of the present invention concern the manufacturing parts that remain strong and dimensionally stable after exposure to e-coat painting conditions. Such manufacturing includes providing a molding compound having about 55–65% by weight polyethylene terephthalate content, about 35–45% by weight filler content, and optionally about 1% by weight blowing agent content. When an injection molding machine is provided, the molding compound can be fed into the injection molding machine to form a raw part. The raw part can then be removed from the injection mold and quenched in a quenching bath to produce a hardened part. The hardened part can then be secured to a partially assembled vehicle. The hardened part, along with the rest of the partially assembled vehicle can then be electro-coated, painted, and baked to produce a final vehicle or sub-assembly thereof.

28 Claims, 2 Drawing Sheets

DIMENSIONALLY STABLE PARTS HAVING GOOD TORSIONAL STABILITY AND COMPOSITIONS AND METHODS FOR MAKING SAME

This application claims the benefit of Provisional Ser. No. 60/350,793 filed on Jan. 22, 2002.

BACKGROUND OF THE INVENTION

The field of the invention is plastic components and, more particularly, the invention relates to automotive parts made of thermoplastic materials that are stable at elevated temperatures and materials for making, methods of manufacture of the same.

A modern automobile is manufactured from a large number of parts. Each of the parts that make up an automobile typically has a number of desired properties that are distinct to a particular part. In a particular automobile part, it may be more or less desirable for the part to be lighter or heavier, more rigid or flexible, or paintable or not.

For those parts that comprise the "body in white" of an automobile, that is the parts that pass through an automobile assembly plant's painting operation, the ability to withstand high temperatures is desirable so that important manufacturing efficiencies can be obtained. In normal vehicle assembly operations, vehicle subassemblies are subject to electro-coating at temperatures in excess of 390° F. and, after painting, vehicle subassmblies are cycled through paint drying ovens where they are exposed to temperatures in excess of 270° F. It is important that parts passing through these conditions do so in good condition. One problem that can arise at these temperatures is the release of "molded-in" stress contained in the part that changes the shape of the part or compromises the strength of the part This is because many components are assembled to a vehicle, including the front end of the vehicle, require precise alignment and durable mounting mechanisms. Headlights, fenders, fascia and a radiator are examples of parts that may be attached directly or indirectly to a grill opening reinforcement. Grill opening reinforcements have been found to be helpful in tying together such components with the forward section of front fenders and the frame of a vehicle as it is being assembled. Other integrated front end modules that support other parts include bumper reinforcements, radiator supports, and inner fender reinforcements. These parts are relatively large and must maintain close tolerances for critical dimensions to meet strict fit and finish standards.

Traditionally, automobile parts for the "body in white" parts have been made from metal because of the tolerance of those materials for the temperatures of the painting operations of the modern automotive industry. For example, grill opening reinforcements and other integrated front end modules have been manufactured from a plurality of sheet metal stampings that are either welded or fastened together.

Metal parts have the disadvantage of being heavy and not as easily formed as plastic parts. Metal integrated front end modules are heavy and add to the overall vehicle weight thereby decreasing the fuel efficiency of the automobile. While metal parts have the benefits of being strong and easily surviving high temperature environments, they can be also unacceptably expensive. Being formed in multiple pieces, metal integrated front end modules require labor intensive assembly operations. Quality control is required to assure proper location of the mounting mechanisms for multiple parts assembled to the integrated front end module.

Recently, sheet molding compound (SMC) has been used to manufacture grill opening reinforcements. SMC grill opening reinforcements are generally slightly less weight than metal grill opening reinforcements. However, for the manufacture of certain parts, such as grill opening reinforcements (GORs), thermoset plastic part, such as those made from sheet molding compound (SMC), cannot readily have necessary features molded into them. Rather, SMC grill opening reinforcements require a substantial investment in tooling for both molding the SMC and finishing the SMC parts after molding. It is generally necessary to machine a SMC grill opening reinforcement by drilling, purring or shaping with a router fastener holes and locating surfaces. Also, the SMC process is relatively slow requiring a large number of mold cavities to manufacture parts on a production basis. SMC is also not a recyclable material which means that at the end of the car's life cycle or if there is any scrap in manufacturing process, it is necessary to dispose of the SMC grill opening reinforcement in landfill instead of recycling. This is because the thermoset plastic, once set, can only be recycled by rendering the part into ash that can only be resold for a minimal economic recovery.

Some exterior auto and truck parts such as fenders, quarter panels, doors, trim parts bumpers, fender extensions and other molded exterior parts of are currently made of moldable thermoplastic polymers to obtain resistance to permanent deformation on impact and corrosion resistance. Typical moldable thermoplastic polymers that are being use for these parts are polypropylene, styrenics, and various heteroatom polymers. While such polymers can be molded into auto and truck parts that are substantially lighter than currently used sheet metal parts, they have limitations. In particular, such parts ordinarily do not pass through industry-standard standard painting operations with acceptable strength and durability. Further, such molded plastic parts have molded-in stress that releases when the part is exposed to heat, such as in a painting operation, thereby altering the dimensions or shape of the part. The release of the molded-in stress leads to unacceptable fit and finish of parts to other parts, and can lead to unacceptable deviations in the alignment of connected parts.

Prior technology has been developed to utilize injection molded thermoplastic parts that are attached to automobile vehicle bodies prior to electro-coating and paint drying oven exposure but are expensive. Exposure of large weight bearing parts to high temperatures results in a loss of dimensional stability since the weight of parts attached to injection molded parts causes the injection molded parts to sag. This results in poor fit and finish and difficulties in assembling components after being exposed to high temperatures. Further, parts must not only demonstrate adequate fit and finish in the short term, but must have adequate torsional stability to prevent cracking. For example, grin opening reinforcements are subject to torque while the automobile is being driven, especially if the road has bumps or holes. A strong, but brittle, part can eventually crack or even fail, which is an unacceptable outcome.

Therefore, there is a need for dimensionally stable parts that exhibit torsional stability and can survive high temperature painting operations. It would be advantageous if such parts could be made from materials that are less expensive and more recyclable than existing parts exhibiting sufficient dimensional stability, torsional stability, and high temperature tolerance.

A number of patents relate to various aspects of motor vehicle component technology. For example, U.S. Pat. Nos. 6,293,615 and 6,287,442 to Tarahomi, disclose an injection molded thermoplastic integrated front end reinforcement made from a fiber reinforced thermoplastic polymer that includes at least 65% post-consumer recycled polyethylene terephthalate. The patents disclose that the polyethylene terephthalate is reinforced with at least 45% glass fibers and mineral filled. The '615 and '442 patents which are commonly owned, are incorporated by reference into this application as if fully set forth herein.

U.S. Pat. No. 6,136,249 to Takeuchi et al. discloses a process for producing a bumper made of synthetic resin that includes a core and an outer layer covering the core. The '249 patent is incorporated by reference into this application as if fully set forth herein.

U.S. Pat. Nos. 5,814,673 and 6,180,685 to Khait disclose methods of making polymeric particulates wherein polymeric scrap material, virgin polymeric material and compounds thereof are supplied to intermeshing extruder screws which are rotated to transport the polymeric material along their length and subject the polymeric material to solid state shear pulverization and in-situ polymer compatibalization, if two or more incompatible polymers are present. The '673 and '685 patents are incorporated by reference into this application as if filly set forth herein.

U.S. Pat. No. 5,503,790 to Clements discloses a crack-proof and resilient article made of PET that is produced from about 40% to 90% regrind PET. The article is characterized in that it ha an intrinsic viscosity between 0.54 and 0.68. The '790 patent is incorporated by reference into this application as if fully set forth herein.

U.S. Pat. No. 5,789,470 to Herbst et al. discloses stabilized recycled plastics comprising macrocylic compounds where the macrocycle contains at least 8 atoms. Herbst et al. also disclose a process for stabilizing recycled plastic compounds using such macrocycle compounds. The '470 patent is incorporated by reference into this application as if fully set forth herein.

U.S. Pat. No. 5,561,186 to Nagaoka et al discloses a resin composition suitable for recycling comprising polyphenylene ether, polyamide, and alkali metal earth oxide, and with optional use of a compatibilizing agent, rubbery material, and inorganic filler. The '186 patent is incorporated by reference into this application as if fully set forth herein.

U.S. Pat. No. 5,881,508 to Irvine et al. discloses a decking extension made from extruded plastic material. The decking extension can be made from a pure material or a combination of two materials one of which is a recycled plastic material. The '508 patent is incorporated by reference into this application as if fully set forth herein.

U.S. Pat. No. 5,876,644 to Nichols et al. discloses a method of recycling post-consumer polyester to obtain recycled polyester of sufficiently high purity to meet food packaging requirements. The method includes cleaning contaminated pieces of post-consumer polyester to remove surface contaminants, melting the surface-cleaned post-consumer polyester, extruding the post consumer melt, blending the melt of post-consumer polyester with a melt of virgin polyester prepolymer, solidifying and pelletizing the blended melt while the virgin polyester prepolymer remains as a prepolymer and polymerizing the solid blended pellets in the solid state. The '644 patent is incorporated by reference into this application as if fully set forth herein.

U.S. Pat. Nos. 5,312,573, 5,523,328 and U.S. Patent Application Publication US 2001/0008322 to Rosenbaum et al. disclose process and apparatus for extruding compounds of thermoplastic and thermoset materials and products made therefrom. By continuously extruding a heated compound of whole tire waste and thermoplastic binder material. The material may be extruded into a continuously cooled, open-ended casting chamber, or can be through a die into a hollow form to form a filled article. The '573, '328 and U.S. Patent Application Publication US 2001,0008322' are incorporated by reference into this application as if fully set forth herein.

U.S. Pat. No. 5,503,788 to Lazareck et al. discloses a method for processing a compound raw automobile shredder residue and virgin and/or contaminated synthetic plastic material. Automobile shredder residue produced by a conventional automobile shredder is formed into a first stream by being ground into a first granulating zone to a reasonably small granular size using conventional equipment. A second stream comprising virgin and/or contaminated synthetic plastics material is ground in a second granulating zone. The two streams are combined to provide a processable compound. The processable compound is introduced into a high intensity mixer. The processable compounds are transformed into a semi-molten discharge stream by the kinetic energy imparted to the processable compound by the mixer and are simultaneously vented by the mixer. The semi-molten compound is then passed on to an extruder or press to form a mass of desired shape, and then cooled. The '788 patent is incorporated by reference into this application as if fully set forth herein.

U.S. Pat. Nos. 5,302,419 and 5,360,661 to Muzzy et al. which discloses apparatus and methods related to flexible towpreg articles made of reinforcing filaments and a matrix forming material made from recycled plastics wherein the reinforcing filaments are substantially wetout by the matrix forming material such that the towpreg plies have a low void content compared to the multiply towpreg. The '419 and '661 patents are incorporated by reference into this application as if fully set forth herein.

U.S. Pat. Nos. 5,217,660 and 5,266,396 to Howard disclose methods of recycling expanded polystyrene foam materials. Unexpanded virgin polystyrene beads having pentane gas contained therein are thermal expanded to produce a supply of expanded beads. Then, a supply of used polystyrene foam is obtained and ground into pieces of small proportions. The used polystyrene foam pieces are then placed in contact with pentane gas. The expanded beads are thereafter combined to form a compound which preferably contains not less than 50% by weight foam pieces. The compound is then place in a mold under heat and pressure to produce a final product. The '660 and '396 patents are incorporated by reference into this application as if fully set forth herein.

U.S. Pat. No. 5,089,571 to Bonk et al. discloses high molecular weight thermoplastic resins with narrow molecular weight distribution and good physical properties that are prepared by regenerating thermally degraded and/or off-grade thermoplastic polyurethane resins. The regenerated high molecular weight thermoplastic resins are disclosed as not presenting any processing difficulties inherent to high molecular weight resins. The '571 patent is incorporated by reference into this application as if fully set forth herein.

U.S. Pat. Nos. 3,976,730 and 4,063,860 to Cushing disclose a method for employing scrap thermoplastic resin in an extruder. The method is for utilizing a high percentage of thermoplastic scrap resins with additional virgin thermoplastic resin in a screw-type extruder. The '730 and '860 patents are incorporated by reference into this application as if fully set forth herein U.S. Pat. No. 4,1338,374 to Currie is a process for manufacturing a shaped article of polyester material by extruding a molten blend of scrap poster and virgin polyester. The molten blend is created by feeding the scrap polyester and virgin polyester into a poymerizing stream that is maintained at elevated temperature and reduced pressure. The '374 patent is incorporated by reference into this application as if fully set forth herein

BRIEF DESCRIPTION OF THE DRAWINGS

The benefits and advantages of the present invention will become more readily apparent to those of ordinary skill in the relevant art after reviewing the following detailed description and accompany drawings, wherein.

DETAILED DESCRIPTION OF THE INVENTION

Figure 1:
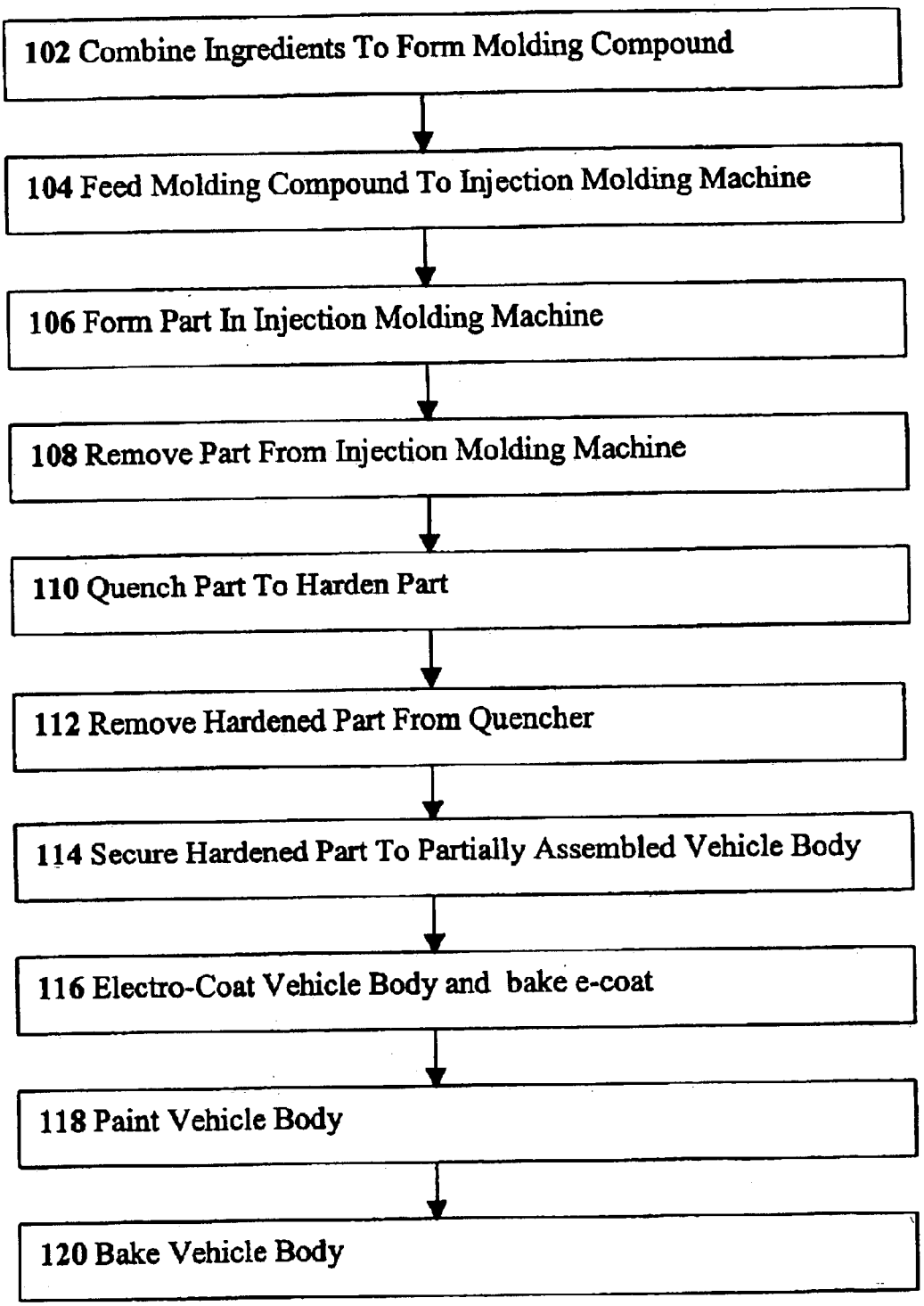
FIG. 1 is a flow chart of a process for producing automotive parts and automobile assemblies of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated. Percentages given below are intended to be read as "by weight" unless otherwise noted.

It is to be further understood that the title of this section of the specification, namely, "Detailed Description of the Invention" relates to a requirement of the United States Patent and Trademark Office, and is not intended to, does not imply, nor should be inferred to limit the subject matter disclosed herein or the scope of the invention.

Referring to the Figures, and in particular to the flowchart of FIG. 1, the processes for formulating a molding compound, forming an automobile part, incorporating the automobile part in a vehicle, and painting the vehicle including the automobile part incorporate the steps of: providing ingredients 100; combining the ingredients to create a molding compound 102; feeding the molding compound to an injection molding machine 104; forming a raw part in the injection molding machine 106; removing the raw part from the injection molding machine 108; quenching the raw part in water to set the part generating a hardened part 110; removing the hardened part from the water 112; securing the hardened part to a partially assembled vehicle body to form an assembled vehicle body 114; electro-coating the assembled vehicle body to form a coated vehicle body followed by a high temperature e-coat bake 116; painting the assembled or coated vehicle body to form a painted vehicle body 118; and baking the painted vehicle body to form a final vehicle body 120.

The ingredients provided 100 for the molding compound can comprise a plurality of compounds containing polyethylene terephthalate resins and filler ingredients. The ingredients provided 100 for the molding compound also can include a blowing agent.

The ingredients for a molding compound can comprise one or more polyethylene terephthalate (PET) thermoplastic resins. In one aspect of the present invention, a single reinforced PET resin having about 40% filler content (by weight) can be used. One line of resins that can be used to make parts of the present invention is RYNITE®. In particular, RYNITE® 940 from DuPont Engineering Polymers of Wilmington, Del. is suitable for use in the present invention RYNITE® 940 is a low-warp 40% mica/glass-reinforced modified polyethylene terephthalate resin having 60% PET content, 25% mica content and 15% glass content by weight. While automotive parts can be made from a pure low warp grade reinforced thermoplastic polyester resin, such parts will be expensive to make. When using a single resin, the filler need not by 25% mica and 15% glass, but can be more mica or more glass. In particular making parts from only RYNITE® 940, a high mica-content PET, could lead to unacceptably high costs for a variety of applications where parts having class A paintable surfaces are not required.

Alternatively, a mixture of a plurality of resins can be used. As will be appreciated by those of ordinary skill in the art, different resins having different percentages of desired components such as PET and fillers can be combined in calculable proportions to achieve a desired result. For example, if a final desired filler content of 40% by mass is desired, the final result can be achieved by mixing resins having 30% and 50% filler by weight in equal weight quantities. The same result could be achieved by mixing resins having 35% and 45% filler in equal weight quantities, or by using two portions of 35% filled material with one portion of 50% filled material. Similarly, if particular proportions of glass or mica as fillers are desired, resins can be blended to achieve the desired proportion of each via simple arithmetic.

One blend of resins that can be formulated by using a plurality of resins is a blend that can have as much as 62% or as little as 58% PET, the remainder being the filler content percentage, which is preferably from about 38%–42%. One blend that can be made is comprised of about 61.5% PET by weight, about 22.5% glass filler by weight, and about 16% mica by weight for a total of about 38.5% filler. Such percentages are not only desirable in blends, a single resin having those proportions can also be used.

One approach can use a first resin, a second resin, and a third resin. When using three resins, the first resin can be a low-warp grade, reinforced (a filled resin wherein the PET is chemically bonded to the filler), fast-cystallizing thermoplastic polyester resin. The second resin can be a highly filled mica/glass virgin PET resin. The second resin can be a reinforced resin like the first resin. As will be appreciated by those of ordinary skill in the art, such a second resin can generally be obtained for a substantially lower cost than resins having the properties of the first resin. A suitable filled mica/glass virgin PET second resin can have a PET content of 55%, a glass content of 25%, and a mica content of 20%. As will be appreciated by those of ordinary skill in the art, if the second resin has percentages that differ from the listed percentages, the content percentages and the added quantities of the first and third resins can be adjusted to achieve the desired results.

The third resin can be a glass reinforced virgin PET resin. As will be appreciated by those of ordinary skill in the art, such a third resin can generally be obtained for a substantially lower cost than resins having the properties of the first resin, and for a somewhat lower cost than resins having the properties of the second resin. One suitable glass filled virgin PET resin has a PET content of 70% and a glass content of 30%. As will be appreciated by those of ordinary skill in the art, if the third resin has percentages that differ from the listed percentages, the content percentages and the added quantities of the first and second resins can be adjusted to achieve the desired results.

The molding compound can also comprise a blowing agent (or foaming agent). The blowing agent can be an exothermic blowing agent, and can also be neutral with respect to chemical acid/base activity in the composition. In particular 5-phenyltetrazole, which can be obtained from Uniroyal Chemical under the brand Expandex 5-PT is a chemically neutral, exothermic blowing agent that can be used in practicing the present invention The first, second, and third resins along with the blowing agent can be combined 102 in a gravimetric mixer to create a molding compound using techniques well known to those of ordinary skill in the art. A preferred molding compound is comprised of about 40% of the fist thermoplastic polyester resin, about 30% the second polyester resin, and about 30% the third polyester resin. The form of the molding compound depends upon the nature of the mixed components. When, as is common, the ingredients of the molding compound are pellets, the molding compound that results after mixing comprises a generally uniform compound of the different kinds of pellets. The resulting molding compound can be used immediately, stored, or shipped to another location to be used. Preferably, the exposure of the molding compound to moisture is minimized during the gravimetric mixing process, and ensuing use, storage or shipping.

The first thermoplastic polyester resin can be comprised of about 60% virgin polyethylene terephthalate reinforced with about 25% mica filler and about 15% glass filler, while the second polyester resin can be comprised of 55% virgin PET reinforced with about 25% glass and 20% mica and the third polyester resin can be comprised of about 70% virgin polyethylene terephthalate and 30% glass filler. The recited combination of those three resins in the recited proportions results in a final resin mixture or blend with about 61.5% virgin PET reinforced with about 22.5% glass and 16% mica In aggregate, the molding compound can have about 58–62% by weight polyethylene terephthalate content, about 38–42% by weight filler content, and optionally about 1% by weight blowing agent content. Molding compound having about 60% polyethylene terephthalate content and about 40% reinforcing filler content are preferred. Generally, where the appearance of the surface of the part is important, it is preferred that the filler content be as high in mica as affordable. For parts that are less demanding than a GOR more of the molding compound can be filler content if such a part has a greater tolerance for brittleness than a GOR part. For example, some parts could have as much as 45% filler content. Alternatively, for parts that require less dimensional stability than a GOR part, less filler content can be used. For example, some parts could have as little as 35% filler content One embodiment of the present invention has a molding compound where the filler content is 18–22% mica. An alternate embodiment of the present invention has a molding compound where the filler content is 18–22% glass. As the total filler content rises, the molding compounds of the present invention tend to result in parts that are more brittle, while parts made of molding compounds with lower filler content tend to have less dimensional stability during an coat painting process. Total filler content of about 38–42% is preferred, with about 40% being much preferred.

The molding compound can be fed 104 to an injection molding machine. The basics of injection molding are well known to those of ordinary skill in the art and is not discussed in detail here. Generally described, the molding compound is fed 104 into a hopper that passes the molding compound down into the injection unit. To form 106 the raw part, the injection unit moves the molding compound away from the hopper and into a heated region. The molding compound melts in the heated region to form melted molding compound. The injection unit then injects the melted molding compound into the mold which is held in a clamping unit. Injection molded parts can be made in a wide variety of shapes and sizes.

In the exemplary embodiment discussed, the molded part is a grill opening reinforcement. An injection molding machine can be provided to mold the molding compound into an automotive part. A mold for forming 106 such a part can be made by having one the plastic enter through a nozzle at one end of the mold and fill toward the other. In the case of the illustrated grill opening reinforcement, the exemplary part is made by injecting to form 106 the part in a width-wise manner.

Not wishing to be bound by theory, it is thought that during the filling of an injection mold, pressure differentials can form in the mold cavity. As more melted molding compound is injected, the pressure of the molding compound increases near the injection gate and air is expelled from the exit gate. When the injected molding compound fills the cavity, the pressure of the molding compound at the injection gate can be significantly higher than at the exit gate. It is thought that such a pressure differential can impart stress to the part. Whatever the mechanism, the stress imparted to the part during the forming process is termed here "molded-in stress." Parts that are formed with blowing agent are believed to have a lower specific gravity and a lower tensile strength than parts formed without blowing agent The presence of the exothermic blowing agent is observed to result in less molded-in stress being present in the formed 106 part. The evolution of gases in the mold from the blowing agent are thought to more nearly equalize the pressure on the melted molding compound throughout the mold during the formation 106 of the part. The more nearly equalized pressure is thought to result in less of a relative pressure gradient across the mold, resulting in a part with superior characteristics, including less molded-in stress. A chemically neural blowing agent, that is a blowing agent that tends not to react chemically with the PET, can permit molding without depolymerization.

Figure 2:
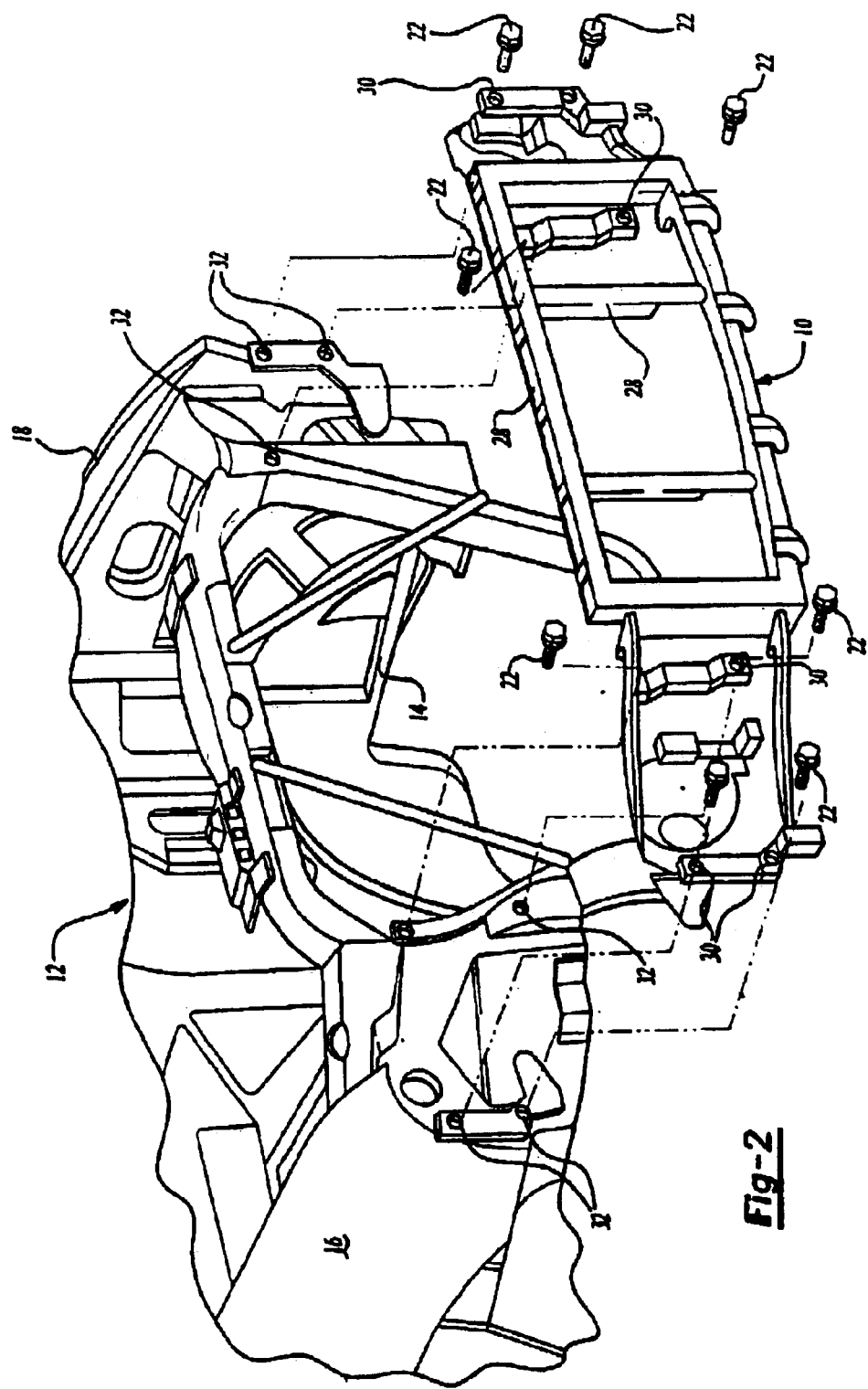
FIG. 2 is an illustration of a part of the present invention as embodied by a grill opening reinforcement for the front end of a vehicle.

Referring to FIG. 2, one advantageous use of the present invention is to make a grill opening reinforcement part 10. A grill opening reinforcement 10 part is a part of a front end system that straddles the radiator of an automobile to connect the front quarter panels (or fenders) and also secure the hood of the car in a closed position. The illustrated grill opening reinforcement 10 is also a mounting point for headlights and provides mounting locations for exterior trim for turn signal lighting.

A grill opening reinforcement 10 and a vehicle subassembly 12 to which the grill opening reinforcement 10 is secured is shown. The grill opening reinforcement 10 is secured to the vehicle subassembly 12 and the frame 14 of the vehicle in the automobile assembly process. Right and left front quarter panel 16 and 18 are secured to the grill opening reinforcement 10. The front quarter panels 16, 18 are also often referred to as fenders. Fasteners 22 can be used to secure the grill opening reinforcement 10 to the vehicle subassembly 12, frame 14 and right and left front quarter panel 16 and 18. A radiator support frame 24 forms part of the vehicle subassembly 12.

Reinforcement ribs 28 are provided on the grill opening reinforcement 10 to reinforce the grill opening reinforcement 10 in locations according to the requirements of a particular part as indicated by engineering computer aided design models. Holes 30 are provided in the grill opening reinforcement 10 and corresponding fastener receptacles 32 are provided on the vehicle subassembly 12 so that fasteners 22 may be inserted through the holes 30 and into the fastener receptacles 32. The fastener receptacles 32 may include clinch nuts or weld nuts, not shown, in which the fasteners 22 are tightened to assemble the front end module 10 to the vehicle subassembly 12.

Light receptacle brackets 34 are provided for assembly to the grid opening reinforcement 10 or the vehicle subassembly 12. Headlights or parking lights, not shown, are later assembled to the light receptacle brackets 34 after painting operations have been completed.

The dimensional stability of the grill opening reinforcement 10 is important because the grill opening reinforcement 10 controls the relative positions of the quarter panels 16, 18 and the hood. Further, the grill opening reinforcement 10 also controls the direction that the headlights point in. Accordingly, the grill opening reinforcement 10 should retain its shape to meet specifications throughout the manufacture and use of the part and the automobile as a whole. The composition and methods of the present invention are observed to maintain dimensional stability of the grill opening reinforcement 10 of 1 mm or better for all of the dimensions of the part Torsional integrity is another important quality of for the gill opening reinforcement 10. As will be apparent to those of ordinary skill in the art, a part that connects the quarter panels 16, 18 (or fenders) will be subject to stresses during the operation of the automobile. For example, if one side of the automobile encounters a hole or a bump that side of the automobile will respectively fall or rise exerting torsional stresses on the grill opening replacement 10. Torsional integrity can be measured by the magnitude by which a part can be twisted without braking the part. The composition and methods of the present invention are observed to allow a grill opening reinforcement 10 to be twisted by 12° without any cracks forming in the grill opening reinforcement.

Referring back to FIG. 1, the description of the present invention is continued with reference to the flowchart. As described above, the integrated grill opening reinforcement 10 is formed 106 by injection molding. A partially assembled vehicle body is provided. The grill opening reinforcement 10 is secured 114 to the vehicle frame 14 and the front fenders or quarter panels 16, 18 are also secured 114 to the grill opening reinforcement. Brackets are also secured 114 to the radiator support. The grill opening reinforcement 10 with a frame 14, fenders 16, 18 and brackets attached to it are the treated 116 by submerging them in a heated electro-coating bath. The vehicle is than painted 118 and the painted vehicle is then baked 120 in a paint oven.

EXAMPLE 1

40 kg of Rynite® 940 pellets, 30 kg of pellets of the second resin, 30 kg of pellets of the third resin, and 1 kg 5-phenyl tetrazole are placed in a gravimetric mixer and combined to form a molding compound having about 40% filler, 1% blowing/foaming agent, and 59% polyethylene terephthalate (PET) resins. The compound is injected into a mold configured to form the grill opening reinforcement using a 1500 ton or larger injection molding machine. The raw formed part is removed from the mold by a robot and placed in 70° F. water for 300 seconds within 100 seconds after removal from the mold. The robot then removes the put from the water and places it on a conveyor belt from which it is inspected, packaged, and prepared for shipping.

EXAMPLE 2

A part having been made according to this invention having about 40% filler content has been tested to a major automobile manufacturer's system design specifications, and has passed all requirements, including dimensional stability (no more than 1.25 mm of movement after e-coat oven exposure), and torsional integrity (greater than 12° torsion without cracking of the part). Up to 20° of torsional integrity has been observed in a GOR made according to the present invention.

From the foregoing it will be observed that numerous modifications and variations can be effectuated without departing from the true spirit and scope of the novel concepts of the present invention. It is to be understood that no limitation with respect to the specific embodiment illustrated is intended or should be inferred. The disclosure is intended to cover by the appended claims all such modifications as fall within the scope of the claims.

I claim:

1. A composition for manufacturing parts that remain strong and dimensionally stable after exposure to e-coat painting conditions comprising:

a molding compound having about 55–65% by weight polyethylene terephthalate content, about 35–45% by weight filler content, and about 1% by weight blowing agent content.

2. The composition of claim 1, wherein the polyethylene terephthalate content is about 58–62% and the filler content is about 38–42%.

3. The composition of claim 1, wherein the blowing agent is an exothermic blowing agent.

4. The composition of claim 1, wherein the blowing agent is a chemically neutral blowing agent.

5. The composition of claim 1, wherein the blowing agent is 5-phenyltetrazole.

6. The composition of claim 1, wherein the molding compound has about 60% polyethylene terephthalate content and about 40% filler content.

7. The composition of claim 1, wherein the molding compound comprises a first thermoplastic polyester resin comprising about 60% virgin polyethylene terephthalate reinforced with about 25% mica filler and about 15% glass filler, a second polyester resin comprising about 55% polyethylene terephthalate content with about 25% glass filler and 20 percent mica filler, and a third polyester resin comprising about 70% virgin polyethylene terephthalate and 30% glass filler.

8. The composition of claim 7, wherein the molding compound comprises about 40% of the first thermoplastic polyester resin, about 30% the second polyester resin, and about 30% the third polyester resin.

9. A part that remain strong and dimensionally stable after exposure to e-coat painting conditions comprising:

a plastic having about 55–65% by weight polyethylene terephthalate content, and about 35–45% by weight filler content, and about 1% by weight blowing agent evolved gas content.

10. The part of claim 9, wherein the blowing agent was an exothermic blowing agent.

11. The part of claim 9, wherein the blowing agent was a chemically neutral blowing agent.

12. The part of claim 9, wherein the polyethylene terephthalate content is about 58–62% and the filler content is about 38–42%.

13. The part of claim 9, wherein the blowing agent gas is the evolution product from decomposed 5-phenyltetrazole.

14. The part of claim 9, wherein the molding compound has about 60% polyethylene terephthalate content and about 40% filler content.

15. The part of claim 9, wherein the molding compound comprises a first thermoplastic polyester resin comprising about 60% virgin polyethylene terephthalate reinforced with about 25% mica filler and about 15% glass filler, a second polyester resin comprised of 55% PET, 25% glass, and 20% mica, and a third polyester resin comprising about 70% virgin polyethylene terephthalate and 30% glass filler.

16. The part of claim 15, wherein the molding compound comprises about 40% of the first thermoplastic polyester resin, about 30% the second polyester resin, and about 30% the third polyester resin.

17. A method for manufacturing parts that remain strong and dimensionally stable after exposure to e-coat painting conditions, comprising the steps of:

feeding a molding compound having polyethylene terephthalate into an injection molding machine to form a raw part, the molding compound having an exothermic blowing agent;

removing the raw part from the injection mold;

quenching the raw part in a quenching bath to produce a hardened part.

18. The method of claim 17, wherein the polyethylene terephthalate is reinforced with about 38–42 percent filler.

19. The method for claim 17, wherein the filler content is about 18–22% mica.

20. A method for manufacturing parts that remain strong and dimensionally stable after exposure to e-coat painting conditions, comprising the steps of:

feeding a molding compound having polyethylene terephthalate into an injection molding machine to form a raw part, the molding compound having a blowing agent, wherein the blowing agent comprises 5-phenyltetrazole;

removing the raw part from the injection mold; and quenching the raw part in a quenching bath to produce a hardened part.

21. The method of claim 20, wherein the polyethylene terephthalate is reinforced with about 38–42 percent filler.

22. The method for claim 21, wherein the filler content is about 18–22% mica.

23. A method for manufacturing parts that remain strong and dimensionally stable after exposure to e-coat painting conditions, comprising the steps of:

feeding a molding compound having polyethylene terephthalate into an injection molding machine to form a raw part, the molding compound having about 58–62% polyethylene terephthalate content and about 38–42% filler content;

removing the raw part from the injection mold; and quenching the raw part in a quenching bath to produce a hardened part.

24. The method for claim 23, wherein the filler content is about 18–22% mica.

25. A method for manufacturing parts that remain strong and dimensionally stable after exposure to e-coat painting conditions, comprising the steps of:

feeding a molding compound having polyethylene terephthalate into an injection molding machine to form a raw part, the molding compound comprising a first thermoplastic polyester resin comprising about 60% virgin polyethylene terephthalate reinforced with about 25% mica filler and about 15% glass filler, a second polyester resin comprised of 55% polyethylene terephthalate reinforced with 25% glass and 20% mica filler, and a third polyester resin comprising about 70% virgin polyethylene terephthalate reinforced with 30% glass filler;

removing the raw part from the injection mold; and quenching the raw part in a quenching bath to produce a hardened part.

26. A method for manufacturing parts that remain strong and dimensionally stable after exposure to e-coat painting conditions, comprising the steps of:

feeding a molding compound having polyethylene terephthalate into an injection molding machine to form a raw part, the molding compound comprising about 40% of the first thermoplastic polyester resin, about 30% the second polyester resin, and about 30% of the third polyester resin;

removing the raw part from the injection mold; and quenching the raw part in a quenching bath to produce a hardened part.

27. The method of claim 26, wherein the polyethylene terephthalate is reinforced with about 38–42 percent filler.

28. The method for claim 27, wherein the filler content is about 18–22% mica.

* * * * *